United States Patent
Patil et al.

(10) Patent No.: US 9,454,327 B2
(45) Date of Patent: Sep. 27, 2016

(54) ANALYTICS BASED CONTROL OF THIN PROVISIONING ENVIRONMENT

(71) Applicant: International Business Machines Corporation, Armonk, NY (US)

(72) Inventors: Sandeep R. Patil, Pune (IN); Riyazahamad M. Shiraguppi, Pune (IN); Gandhi Sivakumar, Bentleigh East (AU); Matthew B. Trevathan, Roswell, GA (US)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 14/472,875

(22) Filed: Aug. 29, 2014

(65) Prior Publication Data

US 2016/0062701 A1    Mar. 3, 2016

(51) Int. Cl.
*G06F 12/02* (2006.01)
*G06F 3/06* (2006.01)

(52) U.S. Cl.
CPC ........... *G06F 3/0653* (2013.01); *G06F 3/0604* (2013.01); *G06F 3/0673* (2013.01)

(58) Field of Classification Search
CPC ... G06F 3/0653; G06F 3/0673; G06F 3/0604
See application file for complete search history.

(56) References Cited

U.S. PATENT DOCUMENTS

| | | | |
|---|---|---|---|
| 7,263,578 B2 | 8/2007 | Kano | |
| 7,949,847 B2 | 5/2011 | Murase | |
| 7,971,025 B2 | 6/2011 | Murase et al. | |
| 8,156,306 B1 * | 4/2012 | Raizen | G06F 3/0608 707/813 |
| 8,234,480 B2 | 7/2012 | Beniyama et al. | |
| 2006/0242378 A1 | 10/2006 | Kano | |
| 2009/0240809 A1 | 9/2009 | La Frese et al. | |
| 2010/0262802 A1 | 10/2010 | Goebel et al. | |
| 2011/0208931 A1 | 8/2011 | Pendharkar et al. | |
| 2012/0054438 A1 | 3/2012 | Kawaguchi | |
| 2012/0131303 A1 | 5/2012 | Goebel et al. | |
| 2012/0166748 A1 | 6/2012 | Satoyama et al. | |
| 2012/0198151 A1 | 8/2012 | Kato et al. | |
| 2012/0221828 A1 | 8/2012 | Fang et al. | |
| 2013/0111170 A1 * | 5/2013 | Kikuchi | G06F 3/0608 711/165 |
| 2014/0229701 A1 * | 8/2014 | Jaquet | G06F 12/0238 711/171 |
| 2015/0154105 A1 * | 6/2015 | Chaurasia | G06F 3/0608 711/154 |

OTHER PUBLICATIONS

Dufrasne et al., "DS8000 Thin Provisioning", IBM, Redpaper, pp. 1-118, Oct. 2009.
Leblanc et al., "Maximize Storage Efficiency with NetApp Thin Provisioning and Symantec Thin Reclamation", Sep. 2010 | WP-7111, pp. 1-11.

* cited by examiner

*Primary Examiner* — Hiep Nguyen
(74) *Attorney, Agent, or Firm* — David B. Woycechowsky

(57) ABSTRACT

Data storage using application storage analytics that: (i) runs a set of application(s) that use a thin provision data storage device for data storage; (ii) determines a set of runtime behavior(s) of the set of applications(s) with respect to use of the thin provisioning data storage device for data storage; and (iii) calculates a runtime representation capacity based on a predetermined over-provisioning ratio and the set of runtime behavior(s).

16 Claims, 6 Drawing Sheets

| Byte\Bit | 7 | 6 | 5 | 4 | 3 | 2 | 1 | 0 |
|---|---|---|---|---|---|---|---|---|
| 0 | OPERATION CODE (8Ah) | | | | | | | |
| 1 | WRPROTECT | | | DPO | FUA | RESERVED | FUA_NV | RESERVED |
| 2 | (MSB) | | | | | | | |
| 9 | LOGICAL BLOCK ADDRESS | | | | | | | (LSB) |
| 10 | (MSB) | | | | | | | |
| 13 | TRANSFER LENGTH | | | | | | | (LSB) |
| 14 | Restricted for MMC-4 | Reserved | | GROUP NUMBER | | | | |
| 15 | CONTROL | | | | | | | |

ANALYTICS BASED CONTROL OF THIN PROVISIONING ENVIRONMENT

BACKGROUND OF THE INVENTION

The present invention relates to the field of thin provisioning environments and more particularly to determination of a "representation capacity" to be used in provisioning storage space in a thin provisioning environment. A thin provisioning environment (that is, a thin provisioning system that includes one or more computers) uses virtualization technology to give an appearance of having a greater amount of physical resources available than the amount of physical resources that are actually available. If a thin provisioning system always has sufficient physical resources to simultaneously support all of the virtualized resources, then it is not thin provisioned. The term "thin provisioning" often relates to storage space for data storage, but it can more broadly refer to an allocation scheme for any physical resource (now known or to be developed in the future) in a computer system.

Some shared storage environments (also called "storage-host-client systems or "S-H-C systems") apply thin provisioning as a way of optimizing utilization of available storage. In some known thin provisioning shared storage systems, the thin provisioning relies on on-demand allocation of blocks of data versus the traditional method of allocating all the blocks up front. Applications that draw on the thin provision shared storage environment tend to reserve more data for future requirements, but at any point of time all allocated space across all applications will not typically be actively in use. A thin provision shared storage environment typically maintains a list of virtual blocks allocated for the application while the actual physical block(s) are assigned to the virtual block(s) only when a write operation is performed.

In conventional thin provisioning environments, it is understood that the provisioning should provide sufficient storage space so that the storage space required by thin provisioning operations does not exceed the space that has been provisioned. Typically an administrator determines, before thin provisioning system operations start, an over-provisioning ratio. Based on an "over-provisioning ratio," the administrator typically configures "representation capacity" (or virtual) for a thin provisioned system. In a thin provision system, the amount of real data storage capacity will be less than total representation capacity. The over-provisioning ratio is the ratio between the representation capacity and the real capacity. The over-provisioning ratio, and its associated representation capacity, is typically chosen by the administrator based on the administrator's experience and/or previous behavior of the thin provisioning system. During normal thin provisioning operations, an application usually is allowed to allocate data storage space only as long as representation capacity is available.

SUMMARY

According to an aspect of the present invention, there is a method, system and/or computer program product that performs the following steps (not necessarily in the following order): (i) receiving runtime information about a set of application(s) that use a thin provision data storage device for data storage; (ii) determining a set of runtime behavior(s) of the set of applications(s) with respect to use of the thin provisioning data storage device for data storage based on the runtime information; and (iii) calculating a runtime representation capacity based on a predetermined over-provisioning ratio and the set of runtime behavior(s).

BRIEF DESCRIPTION OF THE SEVERAL VIEWS OF THE DRAWINGS

FIG. 8 is a diagram helpful in understanding some embodiments of the present invention.

DETAILED DESCRIPTION

Figure 1:
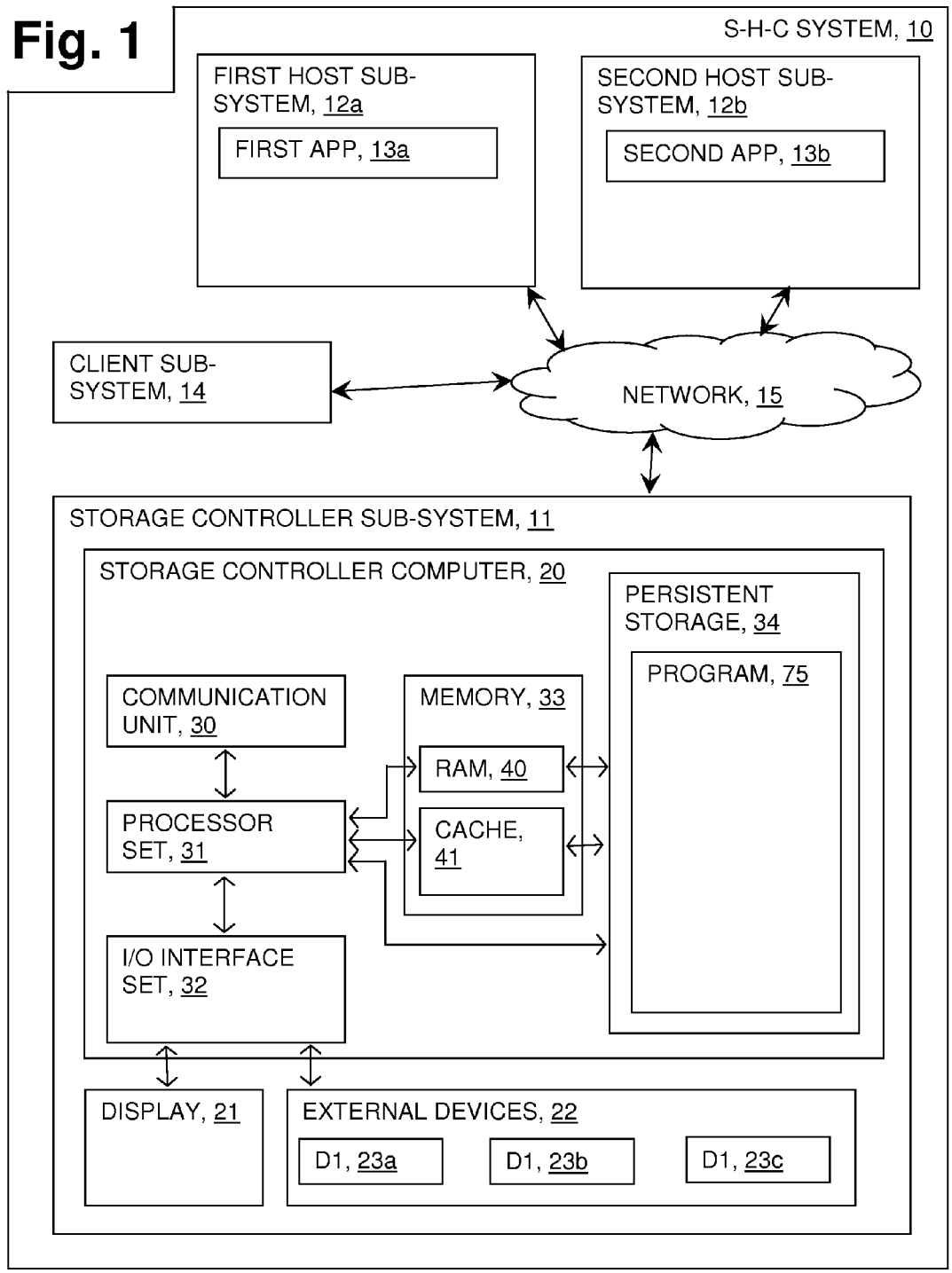
FIG. 1 is a schematic view of a S-H-C system according to the present invention.

According to some embodiments of the present invention, representation capacities for applications using a thin provision data storage device (for example a storage controller sub-system portion of an S-H-C system) are calculated during runtime so that the representation capacities better reflect operational storage behaviors (for example, allocations, de-allocations, space actually used) of the various applications. This "runtime representation capacity" may be used as a basis for allocating (or re-allocating) actual storage space of the thin provision data storage device to the applications. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of storage-host-client system 10, including: storage controller sub-system (also called thin provisioned storage device, or TPD) 11; first host sub-system 12a (including first application 13a); second host sub-system 12b (including second application 13b); client sub-system 14; communication network 15. Storage controller sub-system 11 includes: storage controller computer 20; communication unit 30; processor(s) set 31; input/output (i/o) interface set 32; memory device 33; persistent storage device 34; display device 21; external device set 22 (including first storage disk 23a, second storage disk 23b and third storage disk 23c); random access memory (RAM) device(s) 40; cache memory device(s) 41; and program 75. While the operating environment of this embodiment 10 is in the form of multiple computers connected by a network, alternatively, in other embodiments, there could be: (i) a single standalone computer; or (ii) multiple networks.

Sub-system 11 is, in many respects, representative of the various computer sub-system(s) in the present invention. Accordingly, several portions of sub-system 11 will now be discussed in the following paragraphs.

Sub-system 11 may be a laptop computer, tablet computer, netbook computer, personal computer (PC), a desktop computer, a personal digital assistant (PDA), a smart phone, or any programmable electronic device capable of communicating with the client sub-systems via network 15. Program 75 is a collection of machine readable instructions and/or data that is used to create, manage and control certain software functions that will be discussed in detail, below, in the Example Embodiment sub-section of this Detailed Description section.

Sub-system 11 is capable of communicating with other computer sub-systems via network 15. Network 15 can be, for example, a local area network (LAN), a wide area network (WAN) such as the Internet, or a combination of the two, and can include wired, wireless, or fiber optic connections. In general, network 15 can be any combination of connections and protocols that will support communications between server and client sub-systems.

Sub-system 11 is shown as a block diagram with many double arrows. These double arrows (no separate reference numerals) represent a communications fabric, which provides communications between various components of sub-system 11. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 33 and persistent storage 34 are computer-readable storage media. In general, memory 33 can include any suitable volatile or non-volatile computer-readable storage media. It is further noted that, now and/or in the near future: (i) external device(s) 22 may be able to supply, some or all, memory for sub-system 11; and/or (ii) devices external to sub-system 11 may be able to provide memory for sub-system 11. In this embodiment, the external device set includes thin provision data storage device 23 which is controlled by program 75 as will be explained in detail in the Example Embodiment sub-section of this Detailed Description section. Alternatively, with respect to thin provision data storage device (or "TPD") 23: (i) there may be many TPDs in the system controlled by machine logic according to embodiments of the present invention; (ii) the TPD may be, or include a computer (see definition, below, in Definitions sub-section); (iii) the TPD may be located inside the same computer who's machine logic and processors control allocation of the TPD; and/or (iv) the TPD may be connected to the computer that controls its allocation through a network (instead of directly connected as in embodiment 10 of FIG. 1).

Program 75 is stored in persistent storage 34 for access and/or execution by one or more of the respective computer processors of processor(s) set 31, usually through one or more memories of memory 33. Persistent storage 34: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 34.

Program 75 may include both machine readable and performable instructions and/or substantive data (that is, the type of data stored in a database). In this particular embodiment, persistent storage 34 includes a magnetic hard disk drive. To name some possible variations, persistent storage 34 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 34 may also be removable. For example, a removable hard drive may be used for persistent storage 34. Other examples include optical and magnetic disks, thumb drives, and smart cards that are inserted into a drive for transfer onto another computer-readable storage medium that is also part of persistent storage 34.

Communications unit 30, in these examples, provides for communications with other data processing systems or devices external to sub-system 11. In these examples, communications unit 30 includes one or more network interface cards. Communications unit 30 may provide communications through the use of either or both physical and wireless communications links. Any software modules discussed herein may be downloaded to a persistent storage device (such as persistent storage device 34) through a communications unit (such as communications unit 30).

I/O interface set 32 allows for input and output of data with other devices that may be connected locally in data communication with first server computer 20. For example, I/O interface set 32 provides a connection to external device set 22. External device set 22 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 75, can be stored on such portable computer-readable storage media. In these embodiments the relevant software may (or may not) be loaded, in whole or in part, onto persistent storage device 34 via I/O interface set 32. I/O interface set 32 also connects in data communication with display device 21.

Display device 21 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Example Embodiment

Figure 2:
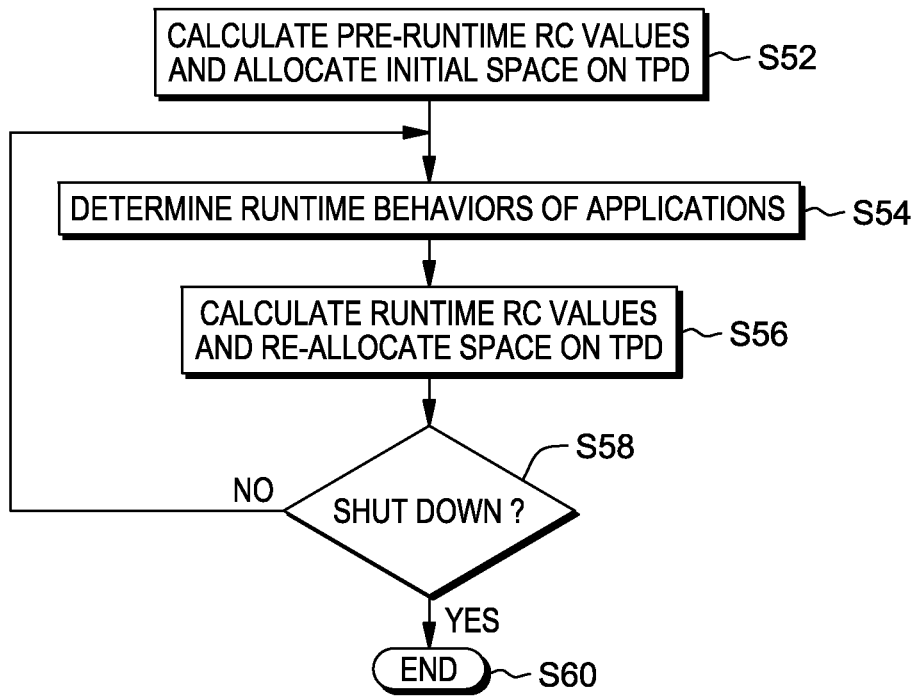
FIG. 2 is a flowchart showing a first method performed, at least in part, by the first embodiment system.
Figure 3:
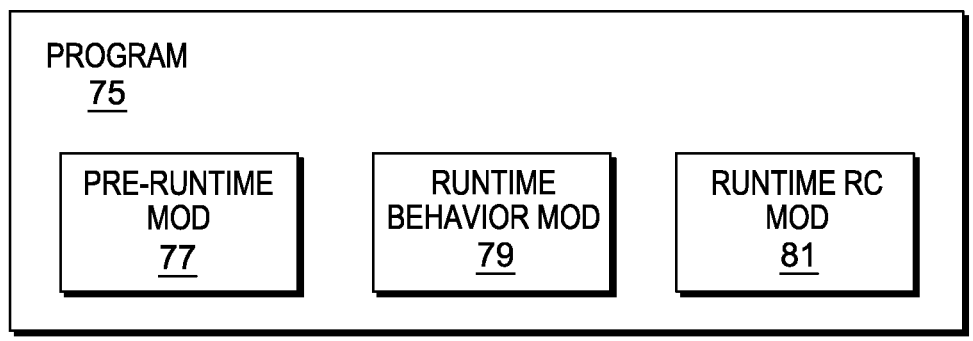
FIG. 3 is a schematic view of a software portion of the storage controller sub-system component of the first embodiment system.

FIG. 2 shows a flow chart 50 depicting a method according to the present invention. FIG. 3 shows program 75 for performing at least some of the method steps of flow chart 50. This method and associated software will now be discussed, over the course of the following paragraphs, with extensive reference to FIG. 2 (for the method step blocks) and FIG. 3 (for the software blocks).

Processing begins at step S52, where pre-runtime module ("mod") 77 of program 75: (i) calculates pre-runtime representational capacity (RC) values for a set of applications that are expected to be run at runtime which will use disks 23a,b,c of TPD 11 for data storage; (ii) calculates a pre-runtime representational capacity (RC) values for thin provision data storage device (TPD) 11, considered as a whole, based on the set of applications that are expected to be run at runtime; and (iii) allocates real physical data storage space on disks 23a,b,c of thin provision data storage device 11 (see FIG. 1) according to the RC values and a predetermined over-provisioning ratio. In this embodiment, step S52 is conventional, and has been described in more detail, above, in the Background section of this document.

Processing proceeds to step S54 where: (i) runtime begins (that is, the applications 13a, b (see FIG. 1) start to run and to use TPD 11 for data storage purposes, as is currently conventional); and (ii) runtime behavior mod 79 tracks runtime behavior of each application of the set of applications with respect to their respective use of TPD 11. In this example, the runtime behaviors tracked by mod 79 are as follows: (i) space used (also sometimes called "write behaviors"); (ii) allocation behavior; and (iii) de-allocation behavior. While these runtime behaviors are conventional, tracking these behaviors, over time during runtime, is not necessarily conventional. The information that is tracked is sometimes herein referred to as "runtime information about a set of application(s) that use a thin provision data storage device for data storage."

Processing intermittently proceeds to step S56 where, as runtime continues, runtime RC mod 81: (i) calculates runtime RC values for the set of applications using TPD 23 for data storage based on the runtime behaviors tracked at step S54 by mod 79 (that is, the "runtime information about a set of application(s) that use a thin provision data storage device for data storage"); (ii) calculates runtime RC values for thin provision data storage device (TPD) 23, considered as a whole and based on the runtime behaviors tracked at step S54 by mod 79; and (iii) re-allocates real physical data storage space on the disks of TPD 11 according to the newly-calculated runtime RC values and a predetermined over-provisioning ratio. A more detailed example of how the RC values can be calculated based on runtime behaviors will be presented, below, in the Further Comments And/Or Embodiments sub-section of this Detailed Description section.

Processing proceeds to step S58, where: (i) if a shut down has been commanded, then processing will come to an end at step S60; or (ii) if no shut down has been commanded, then processing loops back to step S54 to continue runtime operations of TPD 11 and applications 13a, b that utilize TPD 11 for storage.

III. Further Comments And/Or Embodiments

Some embodiments of the present invention recognize the following facts, potential problems and/or potential areas for improvement with respect to the current state of the art: (i) currently conventional storage pattern analysis does not consider the runtime over-provisioning ratio (that is, how much storage an application is actually divided by its currently allocated storage); (ii) "representation capacity" for thin provisioning is defined based on static parameters, historical observation or admin predictions; (iii) consideration of application storage analytics (see definition of "application storage analytics," below, in the Definitions sub-section of this Detailed Description section) is missing in thin provisioning environment; (iv) application storage allocation, de-allocation or application use (write) behaviors are not considered while defining "representation capacity;" (v) early exceeding of space or under-utilization of storage capacity (this will be more fully explained below); (vi) mechanism to define real space reservation for the application on thin provisioning device is missing (this will be more fully explained below); and/or (vii) thin provisioning intelligence is primarily, or exclusively, based on reclaiming unused space or defining a capacity threshold.

With respect to item (v) in the list of the previous paragraph, based on past application I/O (input/out) behavior and future requirement, during configuration of thin provisioning device, an admin (generally a human individual) determines the applicable over provisioning ratio and decides on the representation capacity for the thin provisioning device. This value is fixed and based on the admin's prediction. However, it does not consider, run time behavior of the application allocation, or write I/Os. If the admin prediction goes wrong, and the space is exceeded on the thin provisioning device, it causes application errors, as the recovery procedure admin will need to allocate a new device and transfer the intermittent application I/O to a new device. Considering allocation behavior, it is still possible to predict this situation in advance and control application from allocating more virtual/representation space in advance, but this mechanism is missing currently. In the reverse case, if an application starts using less space, it is possible to represent more representation capacity than configured and have more applications operate on the thin provisioning device.

With respect to item (vi) on the list two paragraphs above, another problem is a mechanism to define real space reservation for the application on the thin provisioning device is missing. Some applications might allocate at startup and some applications might allocate on demand. In general for any device it might be possible to reserve virtual/representation space, but on thin provisioning device, representation capacity is different than real capacity and applications written earlier might dominate space. This potentially can result in an important application not getting space on given thin provisioning device. For example, an admin might want the thin provisioned resources to be uniformly shared between an App1 and an App2 (or shared based on some predetermined priority scheme). However, in cases where App1 is allocating and written at startup, it will dominate space on the thin provisioning device and this generally results in less space, or even no space, for App2.

Some embodiments of the present invention may include one, or more, of the following features, characteristics and/or advantages: (i) provides application storage analytics logic in a thin provisioning environment; (ii) dynamically defines a "representation capacity" by considering application allocation, de-allocation and space use behaviors; (iii) outputs (for example, to an admin and/or application) remaining representation/virtual space of the thin provisioning device based on run time allocation-use behavior of the application; (iv) "representation capacity" for an application is determined based on its allocation and use behavior; and/or (v) consideration of application storage analytics or consideration of run-time allocation behavior of the application to dynamically represent "representation capacity" for thin provisioned resources (sometimes referred to as a "thin provision device") of a thin provision environment.

Some embodiments of the present invention may further include one, or more, of the following features, characteristics and/or advantages: (i) extended applicability to emerging storage industry workloads; (ii) improved systems performance and availability management; (iii) improved capacity planning and capacity management; (iv) improved systems management analytics; (v) improved availability and resilience; (vi) improved intelligent capacity management; (vii) system maintenance; (viii) consider analytics in implementing a thin provisioning environment; (ix) dynamic representation of virtual capacity for thin provisioning device based on run-time application behavior; (x) considering application allocation behavior to control allocation of virtual capacity by application to control exceeding space usage in advance; (xi) add application storage analytics logic in thin provisioning environment for dynamically defining "representation capacity" by considering application allocation, de-allocation and space use behaviors; (xii) show remaining representation/virtual space of thin provisioning device to an admin and/or application based on run time allocation-use behavior of the application; (xiii) an application gets reservation of real physical capacity on thin provisioning device based on its priority and uniformity requirement; and/or (xiv) "representation capacity" for the application is determined based on its allocation and use behavior.

Some embodiments of the present invention may further include one, or more, of the following features, characteristics and/or advantages: (i) consideration of application allocation and use behavior helps in reducing exceeding space or under utilization scenarios mentioned, above, on thin provisioning device; (ii) reservation of real physical capacity for the application ensures priority based space sharing of thin provisioning device for all applications and prevents domination of applications allocating space at startup (as mentioned above); (iii) mechanism where admin defines initial representation capacity for the thin provisioning like existing mechanism based on past application I/O behavior and future I/O requirement; (iv) thin provisioning device will periodically monitor application allocation and write requests resulting in real allocation of blocks; (v) based on monitoring and write requests, software invokes a "representation capacity adjustment routine" which determines a current over-provisioning ratio and determines a new virtual capacity for the thin provisioning device that can presented to the system; (vi) based on application priority and I/O behavior, an admin configures real capacity usage and representation capacity for the given application on thin provisioning device; (vii) information is passed to the admin using special commands, or extended headers of existing commands or other mechanisms known in the art; (viii) thin provisioning device monitors allocation and use behavior of the application and invokes "representation capacity adjustment routine" to determine current representation capacity for the application such that a given application will not be allowed to allocate more than determined representation capacity; and/or (ix) real capacity usage is communicated using a separate communication interface.

Maintenance of a thin provisioning mapping table, according to an embodiment of the present invention, will now be discussed. More specifically, in the embodiment under discussion, a thin provisioning device maintains a virtual block to physical block mapping table as the following Table 1:

| Virtual Block | Status | Physical Block |
|---|---|---|
| VBlock0 | Allocated | PBlock0 |
| VBlock1 | Allocated | PBlock 1 |
| VBlock2 | Allocated | — |
| VBlock3 | Allocated | — |
| VBlock 4 | Freed | — |
| VBlock 5 | Freed | — |

This table contains an entry for each virtual block, with its state allocated/freed. For handling an allocation request by the application: (i) virtual blocks are allocated (see Table 1 at column 2); but (ii) no physical block is assigned (see Table 1 at column 3). When an initial write request is made on a given virtual block, at that point, a physical block is assigned for the virtual block. As shown in Table 1, VBlock0, VBlock1, VBlock2 and VBlock3 are allocated but physical blocks are assigned only for VBlock0 and VBlock1.

Startup of a new application, under the embodiment of the present invention currently under discussion, will now be discussed. At startup of new application on the thin provisioning device, the admin and/or controlling software does the following: (i) determines real capacity usage for the application based on its priority and remaining space on the device; (ii) based on prediction and past behavior, if possible, determine representation capacity for the application or based on default over-provisioning ratio set representation capacity; (iii) pass this information to the thin provisioning device using a separate communication interface; (iv) responsive to this request, the thin provisioning device adds respective entries for the given application in Table 2. Table 2 is an application allocation information table (where RC stands for "representation capacity" and CT stands for "current timeslice"):

| App ID | Real Capacity Allowed (MBs) | RC Allowed (MBs) | Real Capacity Used (MBs) | RC Allocated So Far (MBs) | RC Used In CT (MBs) | PC Allocated In CT (MBs) |
|---|---|---|---|---|---|---|
| 1 | 1000 | 1200 | 5000 | 6000 | 50 | 10 |
| 2 | 2000 | 2500 | 2000 | 3000 | 25 | 40 |
| 3 | 1500 | 2000 | 1000 | 2000 | 2 | 20 |
| 4 | 1200 | 1000 | 6000 | 9000 | 2 | 4 |

Table 2 stores allocation information for each application. At startup of a new application, the admin can define real capacity (column 2) and Representation Capacity (column 3) for the given application. A new row will be added for the application with the ID for the newly-added application. For a given timeslice, column 7 is updated as per application allocation request data and column 6 is updated as per write use request. Columns 4 and 5 are periodically updated at the end of a "capacity adjustment routine" (an example of this routine is discussed below in connection with FIG. 7). The "capacity adjustment routine" refers to Table 2 in order to adjust representation capacity (column 3) for the given application.

An application allocation, write and block deallocation request, for the embodiment currently under discussion, will now be discussed. SCSI protocol reserved bits is used to specify application ID information. For any application, write or allocation or deallocation request, OS (operating system)/driver can inject application ID into write header by using these reserved bits and pass to thin provisioning device. In the embodiment currently under discussion, for a write request this can be done as shown in diagram 800 of FIG. 8 (specifically, CDB (Command Descriptor Block) for SCSI Write (16) as per SCSI-3).

The control software of the embodiment under discussion utilizes reserved bits from Byte 14 (bit-5, bit-6) and Byte 1 (bit 2). This allows for eight (8) application IDs in the system accessing thin provisioning device. For more applications, SCSI extended CDB can be used. Application ID can be provided to the application by the system based on number of applications accessing given thin provisioning device.

Figure 4:
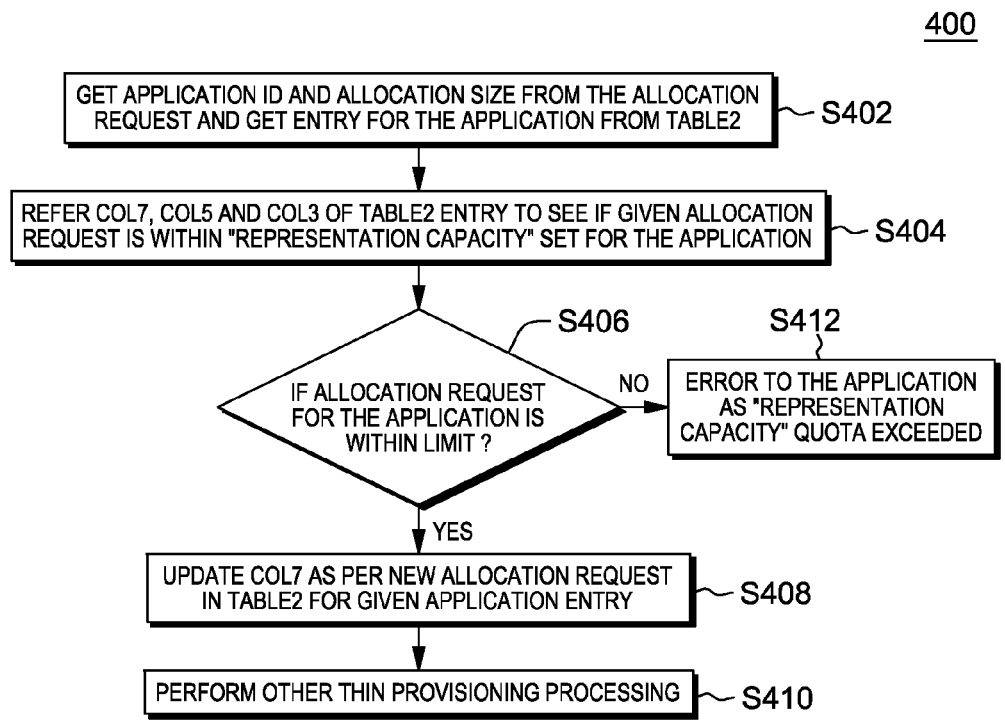
FIG. 4 is a flowchart showing a second method performed according to an embodiment of the present invention.

As shown in FIG. 4, flow chart 400 shows a method for handling an application allocation request at a thin provisioning device. Method 400 includes the following steps (with process flow as shown in FIG. 4): (S402) create row in Table 2 with application identification (ID) and allocation size; (S404) refer to columns 3, 5 and 7 of Table 2 for allocation limits; (S406) determine whether the pending allocation request is within applicable representation capacity limits; (S408) update column 7 of Table 2; (S410) perform other thin provisioning processing; and (S412)

report error to the effect that the representation capacity limit (or "quota") has been exceeded by the application's allocation request.

For the embodiment under discussion, an application allocation request at the thin provisioning device can be done as following: (i) get Application ID and allocation size from the allocation request and Get entry for the application from Table 2; (ii) refer to columns 3, 5 and 7 of the corresponding Table 2 entry to determine whether the given allocation request is within the representation capacity set for the application; (iii) if the request is not within the representation capacity, send an error indication to the application as "Representation Capacity Quota" exceeded; and (iv) if the request is within the representation capacity, then: (a) update column 7 as per new allocation request in Table 2 for given application entry, and (b) perform other thin provisioning processing.

Figure 5:
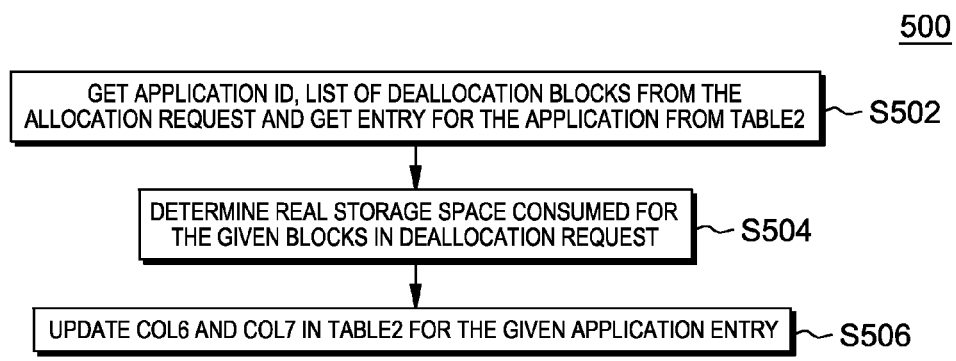
FIG. 5 is a flowchart showing a third method performed according to an embodiment of the present invention.

As shown in FIG. 5, flow chart 500 shows a method for handling an application deallocation request at a thin provisioning device. Method 500 includes the following steps (with process flow as shown in FIG. 5): (S502) get application ID, list of deallocation blocks and applicable entry from Table 2; (S504) determine real storage space consumed by the blocks to which the deallocation request applies; and (S506) update columns 6 and 7 in Table 2 in order to reflect the deallocation. Handling of an application deallocation request at the thin provisioning device, in the embodiment currently under discussion, is as follows: (i) get Application ID, list of deallocation blocks from the allocation request and get entry for the application from Table 2; (ii) determine real storage space consumed for the given blocks in deallocation request; and (iii) update columns 6 and 7 in Table 2 for the given application entry.

Figure 6:
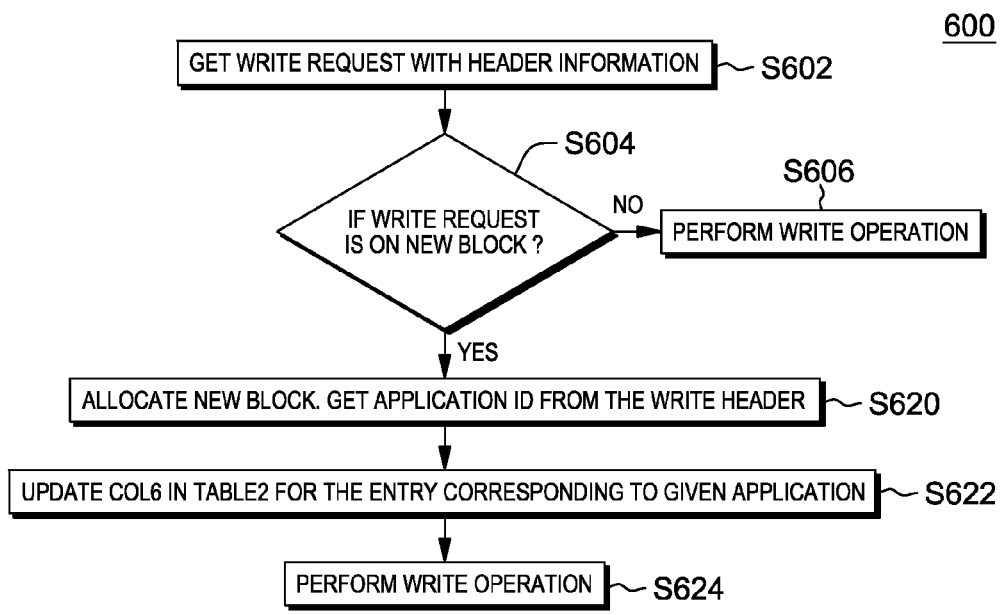
FIG. 6 is a flowchart showing a fourth method performed according to an embodiment of the present invention.

As shown at FIG. 6, flowchart 600 shows a method of handling an application write request at a thin provisioning device. Method 600 includes the following steps (with process flow as shown in FIG. 6): (S602) get write request and header information; (S604) determine whether the write request applies to a new block; (S606) perform write operation; (S620) allocate the new block and get the application ID from the write header of the write request; (S622) update column 6 in Table 2; and (S624) perform the write operation. In the embodiment under discussion, an application write request at the thin provisioning device is done as follows: (i) get write request with header information; (ii) if the write request is not on a new block then perform the requested write operation; and (iii) if the write request is on a new block then: (a) allocate new block and get application ID from the write header, (b) update column 6 in Table 2 for the entry corresponding to given application, and (c) perform the write operation.

Figure 7:
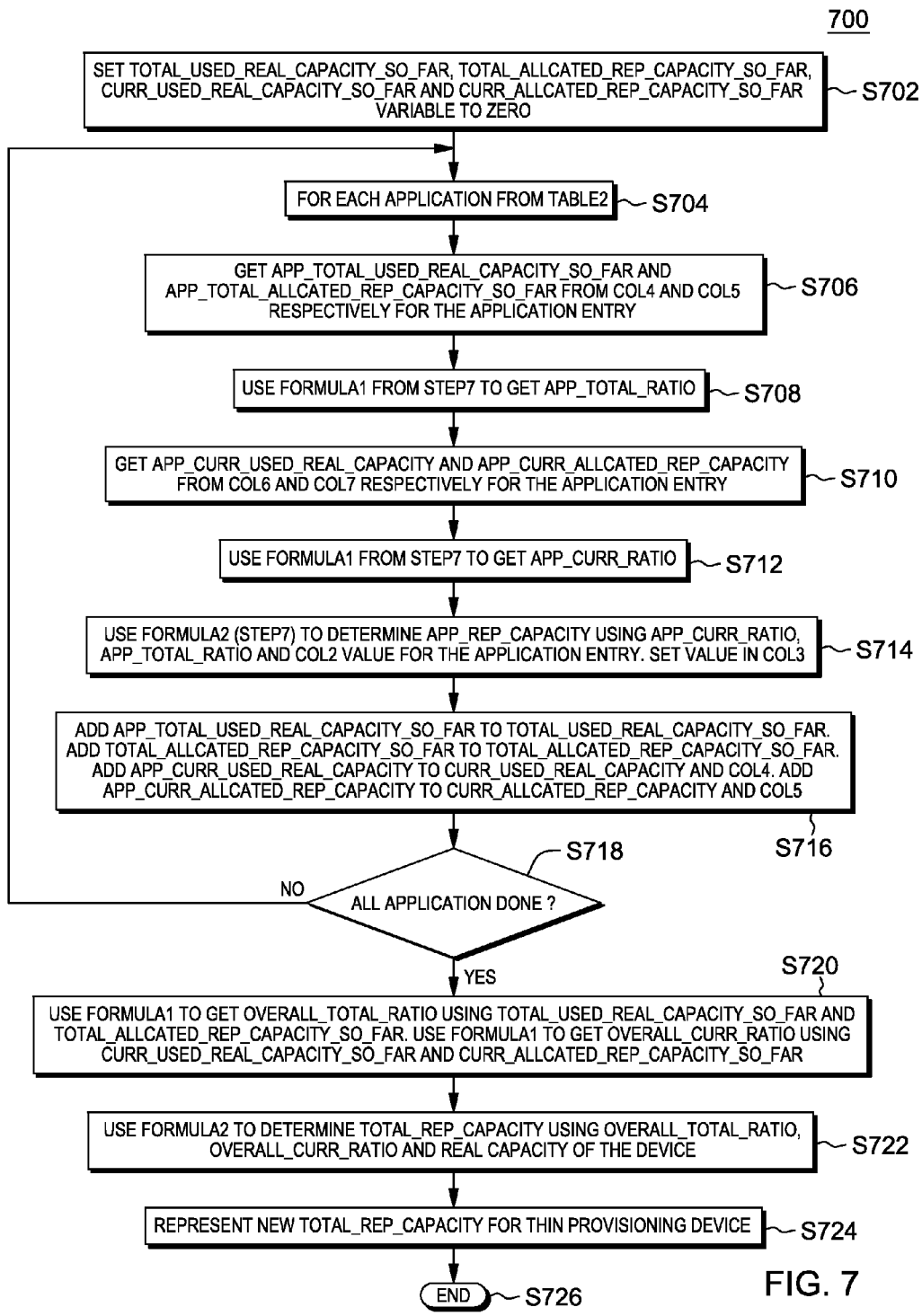
FIG. 7 is a flowchart showing a fifth method performed according to an embodiment of the present invention.

As shown at FIG. 7, flowchart 700 shows a representation capacity adjustment routine. Method 700 includes the following steps (with process flow and content as shown in FIG. 7): (S702); (S704); (S706); (S708); (S710); (S712); (S714); (S716); (S718); (S720); (S722); (S724); and (S726). In the embodiment currently under discussion, the representation capacity adjustment routine: (i) has inputs of real used space (U) and virtual allocated space (V); (ii) has an output in the form of an over-allocation ratio (R); and (iii) uses the formula R=V/U (herein called "Formula 1"). In the embodiment currently under discussion, the representation capacity adjustment routine also uses a Formula 2 which is defined as follows: (i) inputs are current over-allocation ratio (or over-provisioning ratio) (R1), total over-allocation ration (R2) and actual used space (U); (ii) has an output of new representation space (or "runtime representation capacity") (V); and (iii) is calculated by the following equation:

$$V=U*((a*R1)+(1-a)R2), \text{ where } a \text{ is a system defined parameter}$$

In the embodiment under discussion, the representation capacity adjustment routine is invoked periodically by thin provisioning device. This routine is expected to set new representation capacity for each application and overall device level.

The representation capacity adjustment routine of flow chart 700 includes the following actions respectively described in the following several paragraphs.

(i) Define and set to zero the following variables: (a) TOTAL_USED_REAL_CAPACITY_SO_FAR, (b) TOTAL_ALLCATED_REP_CAPACITY_SO_FAR, (c) CURR_USED_REAL_CAPACITY_SO_FAR and (d)CURR_ALLCATED_REP_CAPACITY_SO_FAR;

(ii) For each application, obtain from columns 4 and 5 of Table 2 values for the following variables: (a) APP_TOTAL_USED_REAL_CAPACITY_SO_FAR, and (b) APP_TOTAL_ALLCATED_REP_CAPACITY_SO_FAR.

(iii) Use Formula 1 to calculate the variable APP_TOTAL_RATIO.

(iv) For each application in Table 2, obtain values, from columns 6 and 7 of Table 2, for the following variables: (a) APP_CURR_USED_REAL_CAPACITY, and (b) APP_CURR_ALLCATED_REP_CAPACITY.

(v) Use Formula 1 to calculate the value of the variable APP_CURR_RATIO.

(vi) Use Formula 2, the value of variable APP_CURR_RATIO, the value of variable APP_TOTAL_RATIO and the value of column 2 of Table 2 for each application to calculate and set in column 3 a value for the variable APP_REP_CAPACITY.

(vii) Add the value of variable APP_TOTAL_USED_REAL_CAPACITY_SO_FAR to the value of variable TOTAL_USED_REAL_CAPACITY_SO_FAR.

(viii) Add TOTAL_ALLCATED_REP_CAPACITY_SO_FAR to TOTAL_ALLCATED_REP_CAPACITY_SO_FAR.

(ix) Add column 4 of Table 2, the value of variable APP_CURR_USED_REAL_CAPACITY and the value of variable CURR_USED_REAL_CAPACITY.

(x) Add column 5 of Table 2, the value of variable APP_CURR_ALLCATED_REP_CAPACITY and the value of variable CURR_ALLCATED_REP_CAPACITY.

(xi) Use Formula 1 and the variable TOTAL_USED_REAL_CAPACITY_SO_FAR to obtain the value of variable OVERALL_TOTAL_RATIO.

(xii) Use Formula 1, the value of variable CURR_USED_REAL_CAPACITY_SO_FAR and the value of variable CURR_ALLCATED_REP_CAPACITY_SO_FAR to calculate a value for variable OVERALL_CURR_RATIO.

(xiii) Use Formula 2, the value of variable OVERALL_TOTAL_RATIO, the value of variable OVERALL_CURR_RATIO and the real capacity of the device to calculate a value for the variable TOTAL_REP_CAPACITY.

(xiv) Use the new value, obtained at action (xii), for the variable TOTAL_REP_CAPACITY as the new representation capacity ratio, calculated during runtime, for the thin provisioning device.

Some embodiments of the present invention may further include one, or more, of the following features, characteristics and/or advantages: (i) in situations where, at runtime, it turns out that an application is using more than was expected when calculating its predetermined (that is, preruntime) over provisioning ratio, the application's allocation is adjusted on an ongoing basis during runtime to reduce the probability that the thin provisioning device's available space will be exceeded; (ii) if an admin prediction of an application's data storage usage is incorrect, then the allocation is adjusted during runtime to effectively compensate for this incorrect prediction; (iii) a relatively quick way to adjust allocation to prevent errors occasioned by actually running out of data storage space in the thin provision device; (iv) adjustments to allocations can be made well in advance of errors; (v) based on runtime application allocation use, the over-provisioning ratio (called "representation capacity") is adjusted so that application will not be allowed to over-allocate; (vi) lowers chances of thin provisioning device going out of space and controls problem of capacity exceeding in advance; (vii) in a reverse scenario, increases can be made to the representation capacity in situations where applications allocation-use ratio is high and applications are not using much space out of what has previously been allocated; (viii) more applications can utilize a given thin provisioning storage device because representation capacity realistically reflects actual allocation-use ratios; (ix) application reservation of physical space for the thin provisioning device and per-application representation capacity; and/or (x) ensures that a given application can get fixed amount of physical space on thin provisioned storage.

Some embodiments of the present invention may include one, or more, of the following features, characteristics and/or advantages: (i) controlling application allocations or considering application allocation-use ratio to prevent applications from over allocating; (ii) dynamic representation capacity calculation and re-calculation; (iii) controlling application allocation or adjusting representation capacity based on current allocation-use behavior of the applications; (iv) consideration, on a per application basis, of allocation-use ratios which help determine an amount of space that each running application is going to use out of its allocated space; (v) eliminates need of limiting write I/Os (input/output operations) or suspending low priority applications.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Application storage analytics: a process of inspecting, cleaning, transforming and modeling data in order to do one, or more, of the following: (i) highlight useful information; (ii) suggest conclusions; and (iii) support decision making; data analysis has multiple facets and approaches, encompassing diverse techniques under a variety of names, in different business, science, and social science domains; data analytics is used in many industries to allow companies and organization to make better business decisions and in the sciences to verify or disprove existing models or theories; "application storage analytics" involves inspecting application storage patterns and making storage policy decisions based on it.

Data storage: any type of data saving that is provided by a thin provisioned device.

What is claimed is:

1. A method comprising:
   receiving runtime information about a set of application(s) that use a thin provision data storage device for data storage;
   determining a set of runtime behavior(s) of the set of applications(s) with respect to use of the thin provisioning data storage device for data storage based on the runtime information; and
   calculating a runtime representation capacity based on a predetermined over-provisioning ratio and the set of runtime behavior(s).

2. The method of claim 1 further comprising:
   allocating real physical capacity of the thin provision storage device to the set of application(s) using the runtime representation capacity.

3. The method of claim 2 wherein the allocation of real physical capacity of the thin provision data storage device is an allocation for the set of application(s) considered on an application by application basis.

4. The method of claim 1 wherein:
   the set of application(s) is a plurality of applications including at least two applications; and
   the runtime representation capacity is calculated to be as a plurality of values respectively corresponding to each application of the plurality of applications.

5. The method of claim 1 wherein the set of runtime behavior(s) include at least one of the following: application allocation behavior, application de-allocation behavior and space used.

6. The method of claim 1 wherein the set of runtime behavior(s) include all of the following: application allocation behavior, application de-allocation behavior and space used.

7. A computer program product comprising a computer readable storage medium having stored thereon:
   first program instructions programmed to receive runtime information about a set of application(s) that use a thin provision data storage device for data storage;
   second program instructions programmed to determine a set of runtime behavior(s) of the set of applications(s) with respect to use of the thin provisioning data storage device for data storage based on the runtime information; and third program instructions programmed to calculate a runtime representation capacity based on a predetermined over-provisioning ratio and the set of runtime behavior(s).

8. The product of claim 7 wherein the medium has further stored thereon:
fourth program instructions programmed to allocate real physical capacity of the thin provision storage device to the set of application(s) using the runtime representation capacity.

9. The product of claim 8 wherein the fourth program instructions are further programmed to allocate for the set of application(s) considered on an application by application basis.

10. The product of claim 7 wherein the set of runtime behavior(s) include at least one of the following: application allocation behavior, application de-allocation behavior and space used.

11. The product of claim 7 wherein the set of runtime behavior(s) include all of the following: application allocation behavior, application de-allocation behavior and space used.

12. A computer system comprising:
a processor(s) set; and
a computer readable storage medium;
wherein:
the processor set is structured, located, connected and/or programmed to run program instructions stored on the computer readable storage medium; and
the program instructions include:
first program instructions programmed to receive runtime information about a set of application(s) that use a thin provision data storage device for data storage;
second program instructions programmed to determine a set of runtime behavior(s) of the set of applications(s) with respect to use of the thin provisioning data storage device for data storage based on the runtime information; and
third program instructions programmed to calculate a runtime representation capacity based on a predetermined over-provisioning ratio and the set of runtime behavior(s).

13. The system of claim 12 wherein the medium has further stored thereon:
fourth program instructions programmed to allocate real physical capacity of the thin provision storage device to the set of application(s) using the runtime representation capacity.

14. The system of claim 13 wherein the fourth program instructions are further programmed to allocate for the set of application(s) considered on an application by application basis.

15. The system of claim 12 wherein the set of runtime behavior(s) include at least one of the following: application allocation behavior, application de-allocation behavior and space used.

16. The system of claim 12 wherein the set of runtime behavior(s) include all of the following: application allocation behavior, application de-allocation behavior and space used.

* * * * *